United States Patent
Marcel et al.

(10) Patent No.: US 9,973,503 B2
(45) Date of Patent: May 15, 2018

(54) METHOD AND INTERNET-CONNECTED SERVER FOR REVIEWING A COMPUTER-EXECUTABLE EXPERIMENT

(71) Applicant: Foundation of the Idiap Research Institute (IDIAP), Martigny (CH)

(72) Inventors: Sebastien Marcel, Martigny (CH); Andre Anjos, Vevey (CH); Philip Abbet, Conthey (CH)

(73) Assignee: Foundation of the IDIAP Research Institute (IDIAP) (CH)

( * ) Notice: Subject to any disclaimer, the term of this patent is extended or adjusted under 35 U.S.C. 154(b) by 152 days.

(21) Appl. No.: 14/970,333

(22) Filed: Dec. 15, 2015

(65) Prior Publication Data

US 2017/0171210 A1    Jun. 15, 2017

(51) Int. Cl.
   *H04L 29/06* (2006.01)
(52) U.S. Cl.
   CPC .................................. *H04L 63/10* (2013.01)
(58) Field of Classification Search
   USPC ............................................................. 726/4
   See application file for complete search history.

(56) References Cited

U.S. PATENT DOCUMENTS

| | | | |
|---|---|---|---|
| 2002/0138844 A1 | 9/2002 | Otenasek et al. | |
| 2003/0154406 A1* | 8/2003 | Honarvar | G06Q 10/10 726/10 |
| 2008/0147661 A1 | 6/2008 | Carden | |
| 2008/0320579 A1 | 12/2008 | Rollins et al. | |
| 2009/0132285 A1* | 5/2009 | Jakobovits | G06F 3/0482 705/3 |
| 2010/0042351 A1* | 2/2010 | Covey | G01N 15/1404 702/108 |
| 2016/0328649 A1* | 11/2016 | Simm | G06N 5/022 |

* cited by examiner

*Primary Examiner* — Jason T Lee
(74) *Attorney, Agent, or Firm* — Blank Rome LLP (57) ABSTRACT

An internet-connected server comprising a first module for authorizing a user to access the server for: setting up, on the server, a given configuration for conducting a computer-executable experiment, wherein the given configuration comprises at least an executable instruction and a parameter or input data; executing, on the server, the computer-executable experiment with the given configuration so to produce a numerical result; certifying, on the server, the numerical result so to produce a certified result; and generating, on the server, a certification identifier of the certified result. The internet-connected server further comprises a second module for authorizing a reviewer for: providing the server with the certification identifier; and requesting and/or accessing, on the server, the certified numerical result on the basis of the provided certification identifier.

11 Claims, 4 Drawing Sheets

METHOD AND INTERNET-CONNECTED SERVER FOR REVIEWING A COMPUTER-EXECUTABLE EXPERIMENT

FIELD OF THE INVENTION

The present invention concerns a method and a server for reviewing a computer executable experiment.

DESCRIPTION OF RELATED ART

One of the key aspects of modern technological research and development lies in the use of computers for the simulation of technical phenomena and for the evaluation of collected data. Obtained data are then arranged in tables and figures and used in technical reports for supporting technical decisions.

Similarly, in computational science, computers are used for the simulation of known phenomena and for the evaluation on data collected from natural observations. Obtained data are commented and organized in tables and figures for pursuing scientific publications.

Commonly, these technical documentations and publications are reviewed by a reviewer or a group of reviewers in order to validate the presented data and conclusions, before such documents are used for technical decisions or public disclosures.

Methods and systems supporting remote reviewing have been thus proposed for facilitating reviewing tasks.

US pat. Appl. US2008/0147661 discloses a website enabling authors to submit written manuscripts to a publisher, society or agency for immediate review, editing and publishing. The reviewing process, reviewing access and decisions communication are centrally handled so to treat all the processes from the submission of the manuscripts to theirs publication.

US Pat. Appl. US2002/0138844 discloses a system and a method for centrally warehousing, reviewing, authorizing and controlling public accessibility of digital audio/video programs provided by independent producers.

US pat. Appl. 2008/0320579 discloses a method and a system destined to automatically validate the accuracy and the existence of references cited within a publication.

Although a number of proposed methods and systems for reviewing, the veracity of data provided within tables and figures of the documents to be reviewed is currently based on trusting the authors, as these data are difficult to verify from a reviewer, in particular by a remotely located reviewer.

BRIEF SUMMARY OF THE INVENTION

The aim of the invention is to provide a system and a method for reviewing a technical document providing veracity evidences of cited data.

Another aim of the invention is to provide a system and a method for reviewing a technical document providing to a reviewer the capacity to verify the veracity of cited data.

Another aim of the invention is to provide a system and a method for reviewing a technical document and controlling its public accessibility.

According to the invention, these aims are achieved by means of an internet-connected server comprising:

a first module for authorizing a user to access the server and for: setting up, on the server, a given configuration for conducting a computer-executable experiment; wherein the given configuration comprises at least an executable instruction and a parameter or input data;

an execution unit for executing, on the server, the computer-executable experiment with the given configuration so to produce a numerical result;

a certification unit for certifying, on the server, the numerical result so to produce a certified result; and a unit for generating, on the server, a certification identifier of the certified result;

and the server further comprising a second module for authorizing a reviewer and for:

providing the server with the certification identifier from the reviewer; and requesting and/or accessing, on the server, the certified numerical result on the basis of the provided certification identifier.

Advantageously, the first module is further arranged to authorize the user to modify the accessibility, on the server, of the numerical result, the given configuration, the executable instruction and/or the parameter or input data. In particular, the first module is arranged to authorize the user to render unmodifiable (e.g. set to read-only) the numerical result, the given configuration, the executable instruction and/or the parameter or input data. Moreover, the first module is arranged to authorize the user to restrict reading access to the numerical result, the given configuration, the executable instruction and/or the parameter or input data.

Advantageously, the second module is further arranged to authorize a reviewer to verify, on the server, the experiment with the unmodifiable given configuration, in particular by authorizing a reviewer to reproduce, on the server, the experiment with the unmodifiable given configuration.

Advantageously, the internet-connected server is a distributed server.

The aims of the invention are further achieved by means of a method for reviewing a computer-executable experiment, the method comprises a step of:

setting up, on an internet-connected server, a given configuration for conducting the computer-executable experiment; wherein the given configuration comprises at least an executable instruction and a parameter or input data;

executing, on the server, the computer-executable experiment with the given configuration so to produce a numerical result;

certifying, on the server, the numerical result so to produce a certified result; and generating, on the server, a certification identifier of the certified result; and authorizing a reviewer for:

providing the server with the certification identifier; and requesting and/or accessing, on the server, the certified numerical result on the basis of the provided certification identifier.

Advantageously, the method further comprises a step of making, on the server, the certified result, the given configuration, the executable instruction and/or the parameter or input data unmodifiable.

Advantageously, the method further comprises a step of authorizing a reviewer for producing a reproduced numerical result by executing, on the server, the experiment with the unmodifiable given configuration.

Advantageously, the method further comprises a step of setting up, on the server, an accessibility restriction for third party for requesting and/or accessing, on the server, to the numerical result, the certified numerical result, the given configuration and/or the unmodifiable given configuration.

Advantageously, the method further comprises a step of changing the accessibility restriction for requesting and/or accessing, on the server, to the certified numerical result, the given configuration and/or the unmodifiable given configuration upon a reception of a communication from the reviewer.

The aims of the invention are further achieved by means of a method for reviewing a computer-executable experiment, the method comprises a step of:

providing an internet-connected server with a certification identifier; and requesting and/or accessing to, on the server, a certified numerical result on the basis of the provided certification identifier; wherein the certified numerical result has been produced by certifying, on the server, a numerical result previously obtained by executing, on the server, a computer-executable experiment with a given configuration.

Advantageously, the certified numerical result and/or the given configuration are made unmodifiable on the server.

Advantageously, the method further comprises a step of producing a reproduced numerical result by executing, on the server, the computer-executable experiment with the unmodifiable given configuration.

The proposed solutions provide evidences to a reviewer of the veracity of an experiment result cited within a document under reviewing.

The proposed solutions allow the reviewer to verify the veracity of the certified result, in particular by accessing certified numerical result, the given configuration and/or the unmodifiable configuration. Moreover, the reviewer can verify the veracity of the certified result by reproducing the same experiment on the server and comparing the reproduced result with the certified result.

The proposed solutions further allow authorizing and controlling public accessibility of experiment configuration and result, before, during and after the reviewing process as well depending on the reviewing assessment. The accessibility assigned to third party could be modified on the server following a reviewing result or assessment provided by the reviewer.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
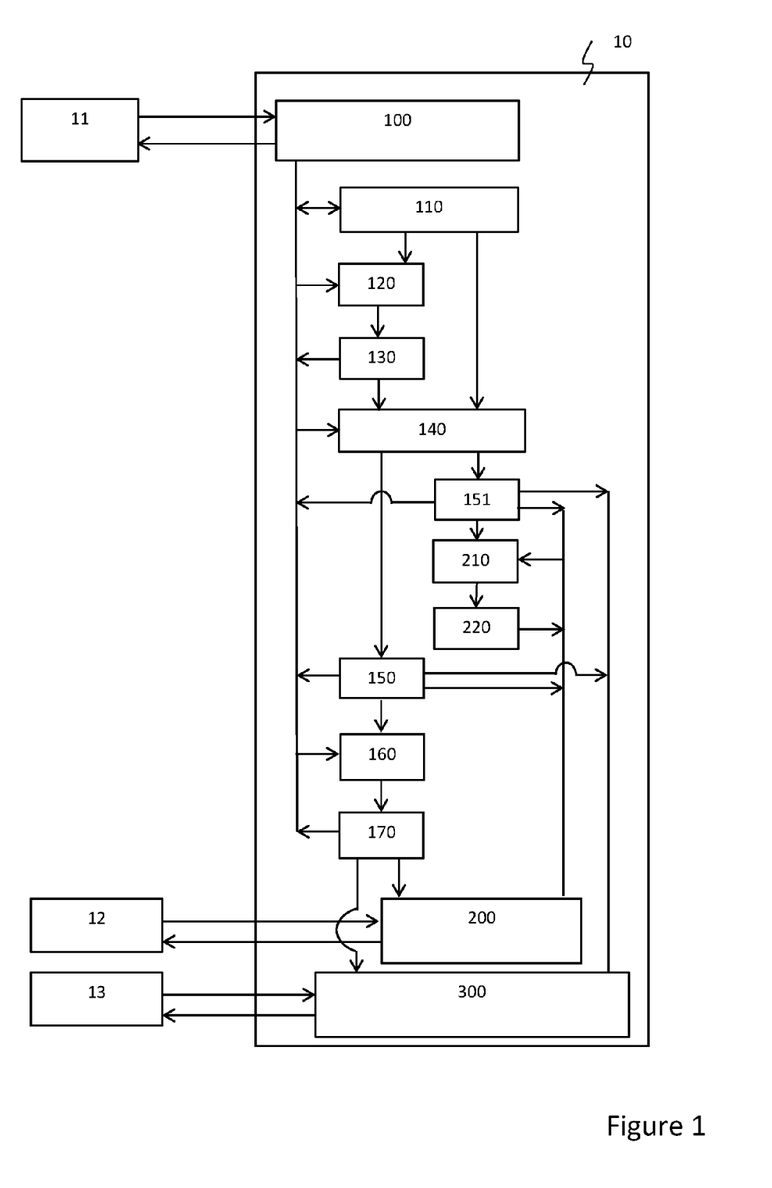
FIG. 1 shows a structural view of a server for experiment reviewing, according to the invention.

FIG. 1 illustrates a server 10 configured to transfer data on internet with a plurality of remotely located client devices 11, 12, 13, i.e. PCs, laptop, multimedia portable devices and smartphones.

The internet-connected server 10 comprises a first module 100 for authorizing a user 1 to access the server for setting up, on the server, a given configuration for conducting a computer-executable experiment, through a client device 11.

The user can be any physical person in charge of working on, setting up and/or executing a computer-executable experiment.

The internet-connected server 10 further comprises a second module 200 for authorizing a reviewer 2 to access the server for verifying a conducted experiment, through a client device 12.

The reviewer can be any physical person in charge of verifying the veracity of a result obtained by a computer-executable experiment executed on the internet-connected server. The reviewer can be elected by the user or by another entity in charge of the reviewing of a work or document, e.g. a manuscript, a digital document or a printed document, citing such result.

The reviewer can be a user (i.e. a physical person in charge of working on, setting up and/or executing a computer-executable experiment on the internet-connected server) that is further in charge of verifying the veracity of a result obtained by a computer-executable experiment set up by another user. In such case, the same person could accumulate the privilege of the user and the privilege of the reviewer, e.g. he could access the server either as user via the first module 100 or as a reviewer via the first module 100. Advantageously, the first and second module 100, 200 could be arranged to cooperate together so as to allow the same person to simultaneously access the server as user and as a reviewer.

The second module 200 is configured to permit an authorized reviewer for:

providing the server 10 with a certification identifier; and
accessing the server, on the basis of the provided certification identifier.

The first module 100 is configured to permit an authorized user to set up and memorize a predefined configuration of a computer executable experiment that is destined to produce, on the server, a numerical result access. The server is thus provided, in particular, of a storing unit 110 for storing the configuration setup, an execution unit 120 for executing the experiment with the setup configuration and a storing unit 130 for storing the obtained numerical result.

The first module 100 provides the user with a read-and-write (w/r) access to the configuration storing unit 110 and control on the execution unit 120. For certification issues, the first module 100 can provide to the user read-only access to the result storing unit 130.

The computer-executable experiment could be defined by a high-level program that comprises instruction codes, parameters and data. The computer-executable experiment can be supported by I/O and algorithms libraries and by sets of Application Programming Interface (API) functions.

The server further provides a certification unit 140. This unit 140 is controllable by the user through the first module 100. The unit 140 certifies the generated result according to the set-up experiment configuration.

In order to provide veracity, the certified result can be stored in a dedicated storing unit 150 whose accessibility to the user and to the reviewer is restricted to read-only access.

The server is further equipped with a unit 160 for generating a certification identifier connected to the certified numerical result. The generated certified numerical result can be stored in a dedicated memory unit 170 that is read-only accessible to the user and at disposal of the second module 200 for access controlling.

The certification identifier can be a unique identifier in form of an alphanumeric sequence, an internet address link, a hash value or a cryptographic key.

Advantageously, the server 10 can be configured by the user 1 to automatically send the generated certification identifier to a pre-selected reviewer 2.

In order to provide veracity of the certified numerical result, the server can be configured to render the certified result unmodifiable upon a certification operation is commanded by the user.

The certified result will thus unmodifiable substantially for a time period that is, at least, compliant with a fulfillment of the reviewing process and/or with a validity period of the conducted experiment. The time period could be a pre-defined period that could be within a range of 1 month to 100 years, preferably within a range of 1 year to 10 years.

At the same time, the server can be configured to make public the certified result.

The accessibility of the dedicated memory unit 150 can be thus modified so that no more writing operation is allowed upon a numerical result which is stored therein as a result of certification operation.

Advantageously, the server can be configured to make the set-up configuration, which generated the certified numerical result, unmodifiable. The server can thus comprise a dedicated storing unit 151 for storing the experiment configuration that has led to the numerical result, upon a certification operation on this numerical result is commanded by the user.

Similarly to the memory unit 150, the accessibility of the dedicated memory unit 151 can be modified so that no more writing operation is allowed upon a configuration is stored therein as a result of a certification operation. The accessibility of the memory unit 150 by the user and by the reviewer can be thus configured to allow read-only access.

The accessibility of storing units 150 and 151 can be configured by software and/or by hardware means.

Advantageously, the certification unit 140 and the certification identifier generation unit 160 can be grouped within a single unit providing both the certification and the certification identifier.

The second module 200 is configured to permit an authorized reviewer to receive on his client device 12 the certified numerical result stored in the memory unit 150 that is associated with the provided certification identifier.

For providing a high level of evidence of the veracity of the certified result, the server can be provided with an experiment execution unit 210 configured to re-conducting the experiment with the unmodifiable configuration and to store the reconstructed numerical result in a memory unit 220. The second module 200 can thus be configured to allow the authorized reviewer to command a re-conduction of the experiment related to the provided certification identifier and to access/receive the reconstructed result.

Alternatively or additionally, the server 10 can be configured to withdraw or to invalidate a certified numerical result upon the user operate a modification on the experiment configuration that led to the certified numerical result.

The access to the experiment configuration, e.g. storing unit 151, can be defined by the user by setting up the second module 200, in order to meet non-disclosure requirement and/or disclosure agreement with the reviewing organization. The second module 200 can be configured to permit to change the accessibility of an authorized reviewer to the permanently stored configuration, e.g. to the storing unit 151, in a manually, semi-automatically and/or fully automatically way, upon an occurrence of pre-defined and computer-treatable events. The events can be a preliminary communication about the reviewing assessment, a NDA contract signature, a cease of a confidentiality restrictions or clause about the experiment, etc.

The second module 200 can be further configured to authorize the reviewer to access parts of the server computational resources 210 and to access contents of storing resources 150, 151 on the basis of additional provided credentials, e.g. personal passwords, numerical certificates or IDs.

The internet-connected server 10 further comprises a third module 300 for restricting access to client device 13 of a third party.

Third party is any physical or virtual person not authorized to act neither on the conduction of the experiment, nor in the experiment review process.

The third module 300 is configured to permit a particular restrictions assignment to a third party that is different to restriction assigned to a reviewer.

The third module 300 can be configured to permit to change third party restriction manually, semi-automatically and/or fully automatically upon occurrence of pre-defined and computer-treatable events. Advantageously, activating events are linked with reviewing procedure steps and assessment.

The above-mentioned computational and memory resources 110-170 and 210-220 can be can be Hardware, Software or mixed Hardware/Software resources based on distinct and dedicated resources or general-purpose resources that are temporarily allocated for executing specific functions. The above-mentioned computational and memory resources 110-170 and 210-220 can be a mix of dedicated and general purposes resources. The memory resources may be organized as a database or set of databases, such as for example a SQL database, a set of XML documents, or a cloud database.

The first, second and third modules 100, 200, 300 can be Hardware, Software or mixed Hardware/Software units based on distinct and dedicated resources and/or on general-purpose resources that are temporarily allocated for executing access control functions.

The first, second and third modules 100, 200, 300 can be integrated within a unique access control unit.

The server 10 could be a physical server, for example a machine executing a Windows or Linux operating system and software compatible with this operating system. Alternatively, the server 10 could be a virtual server such as, without limitations, a VMWare server. The server 10 could also comprise a set of different machines or equipments, such as a set of servers or equipments in a LAN or connected over the Internet. For example, the server 10 could be or comprise a cloud server.

Figure 2:
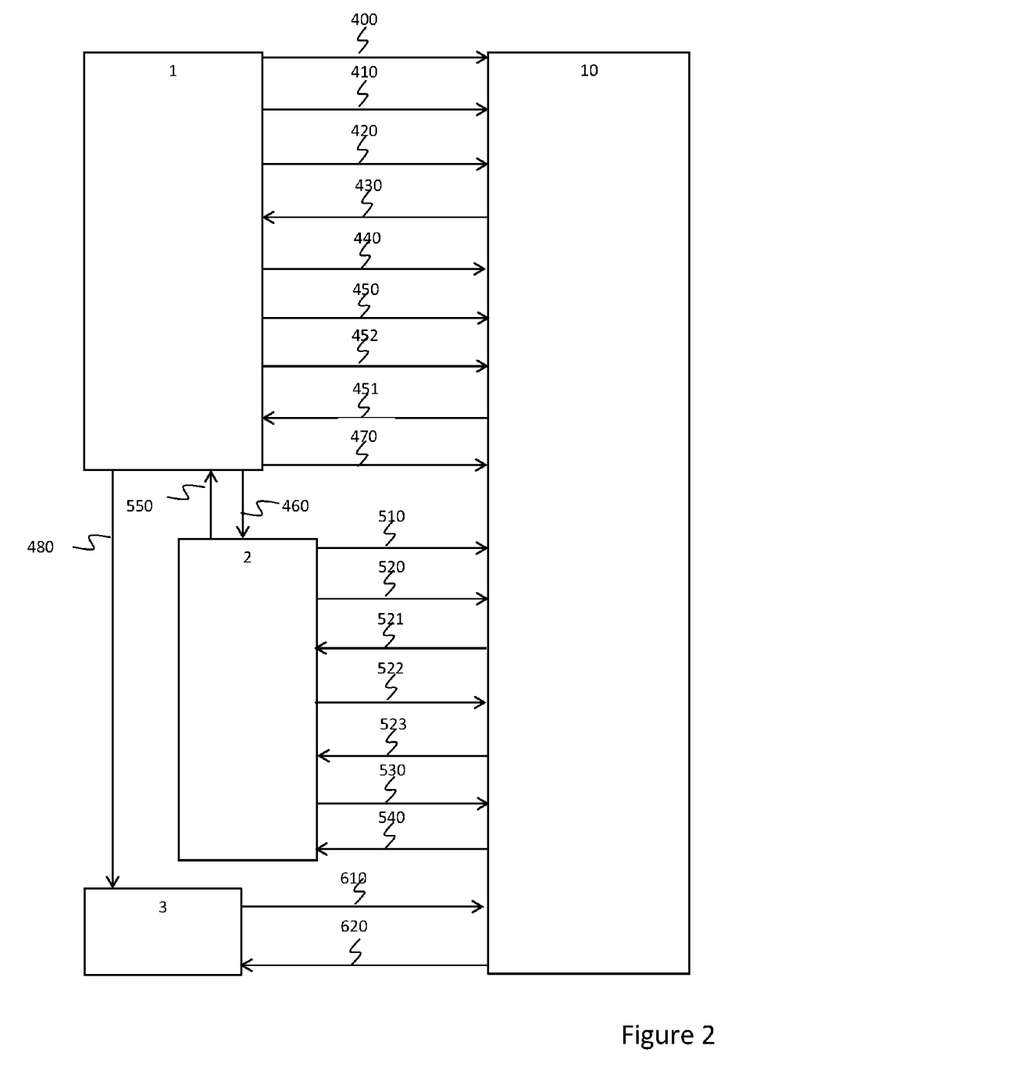
FIG. 2 shows interactions between a user, a reviewer and third party during a reviewing procedure of an experiment conducted on the server, according to the invention.

FIG. 2 shows an example of interactions between a user, a reviewer and third party during a reviewing procedure of an experiment conducted on the server 10.

Pursuing a revision or a reviewing of a computer-executable experiment, the user 1 set up, on the server 10, a given configuration for conducting the computer-executable experiment (step 410). The given configuration comprises at least an executable instruction and a parameter or input data.

Once the configuration is finished, the user conducts, on the server 10, the computer-executable experiment with the given configuration (step 420).

Generated numerical result are then stored on the server and placed at disposal of the user in order to be viewed, analyzed and/or assessed (Step 430). The numerical result can be grouped in tables or lists as well as in form of graphs and illustrations.

In order to guarantee confidentiality, the user can set up, on the server 10, an accessibility restriction for third party for requesting and/or accessing, on the server 10, to the experiment configuration and results (step 400).

If necessary, successive experiments can be conducted with modified configuration so to obtain numerical result suitable to represent a particular phenomenon or to support a technical decision (Steps 410, 420, 430).

When the user reputes the numerical result of the conducted experiment satisfying for representing a particular phenomenon or for supporting a technical decision, the user can request the server 10 to certify the numerical results obtained with the given configuration (Step 440).

The certifying operation can lead to make unmodifiable, on the server, the numerical result and the given configuration that has led to the numerical result, The user requests then the server 10 to provide him a certification identifier of the certified numerical result (Step 450). The server would thus generate it and provide it to the user (Step 451).

Advantageously, the server 10 can be configured to automatically generating a certification identifier upon a certification on a numerical result is requested (Step 440).

Advantageously, the server 10 can be configured to further provide the user with additional information concerning the executed experiment pursuing a reviewing procedure, in particular a launch of a reviewing procedure. For example, the server 10 can provide the numerical result in form of customizable lists, tables and/or graphics. The server can provide the numerical result to the user within a pre-formatted, advantageously editable, document that could be used for submitting the numerical result to a reviewer. The server 10 can furthermore provide a reviewing template suitable for a pre-defined reviewing process.

A module for authorizing a reviewer for requesting and/or accessing, on the server, a certified numerical result on the basis of the provided certification identifier has to be set up on the server.

Advantageously, the server 10 is configured to simultaneously allow a plurality of distinct users to set up, on the same server 10, their own experiments, this independently one from the others. The control access module can thus be configured to authorize a distinct reviewer to access the certified result within a plurality of certified results hosted by the server 10 that corresponds to the provided certification identifier.

The setting up of the controlled access can be realized in a manually or semi-automatic way (Step 452). The setting up can be commanded by a distinct request of the user (Step 452) or triggered by the request for a certification (Step 440) and/or by the request for generating the certification identifier (Step 450). Alternatively or additionally, the setting up can be executed on the server automatically with a pre-defined configuration, e.g. upon a reception of a request for a certification (Step 440) or for generating the certification identifier (Step 450).

The controlled access set up can involve additional information, in particular information permitting to identify the reviewer, e.g. reviewer credentials, personal passwords, numerical certificates or IDs.

A reviewer 2, appointed for the review of a numerical result cited within a technical or scientific work or document, can receive a certification identifier for cited numerical result, directly from the user 1 (step 460), from the server 10 or by another way.

The reviewer can thus use the certification identifier to access the certified result on the server 10 in order to verify his veracity.

The reviewer 2 would thus provide the received certification identifier to the server 10 (Step 510) and request to receive or access the certified numerical result on the server (Step 520).

Advantageously, both steps of providing the received certification identifier to the server 10 (Step 510) and of requesting to receive or access the certified numerical result (Step 520) can be fused in a unique command.

On the basis of the provided certification identifier and eventually on additional accessing information providing authorization, the certified numerical result is provided to the reviewer 2.

The reviewer can require the server 10 to receive or access the unmodifiable configuration that led to the certified numerical result (Step 522). According to the accessibility set up by the user, the reviewer will receive or have access, on the server 10, to the unmodifiable configuration (Step 523).

The reviewer can, additionally or alternatively, require the server 10 for reproducing the numerical result by reproducing the experiment with the unmodifiable configuration (Step 530).

According to the accessibility set up by the user, the reviewer will receive or have access, on the server 10, to the reproduced numerical result (Step 540).

Once the reviewing process has been completed, the reviewer can address a reviewing assessment to the user 1, either directly or by means of the server 10 or by another way (Step 550).

Upon a receiving of a communication from the reviewer, the user can modify the accessibility of the experiment result and configuration for the reviewer and/or for third party.

For example, upon a positive reviewing communication permitting a diffusion of the experiment result, the accessibility to experiment result and the configuration can be changed from public unavailable to public available for a pre-defined group of person or for any third party.

In case of a paper or article review in view of a publication, upon a positive reviewing communication, the user can change the accessibility to experiment result and the configuration from public unavailable to public available for any third party.

The accessibility changing can either be triggered by the user itself or be automatically executed by the server 10 upon a receipt of a predefined communication from the authorized reviewer 2.

After such as third party accessibility modification, any third party that is interested on the reviewed work or document is thus authorize to request and to receive a certified numerical result, as well as to access the experiment configuration, on the server (Step 610, 620).

The user 1 can, alternatively or complementary to a personal message (Step 480), configure the server 10 to send automatically, upon a receipt of a positive reviewing communication, a message to a group of pre-selected third party informing about the reviewed work or document.

According to the invention, user's steps 400-470 can be realized through either a user's client device in remote communication with the server 10 or by means of a remote device that is part of the server (distributed server).

According to the invention, reviewer's steps 510-540 can be realized through either a reviewer's client device in remote communication with the server 10 or by means of a remote device that is part of the server (distributed server).

According to the invention, third party's steps 610-620 can be realized through either a third party's client device in remote communication with the server 10 or by means of a remote device that is part of the server (distributed server).

Figure 3:
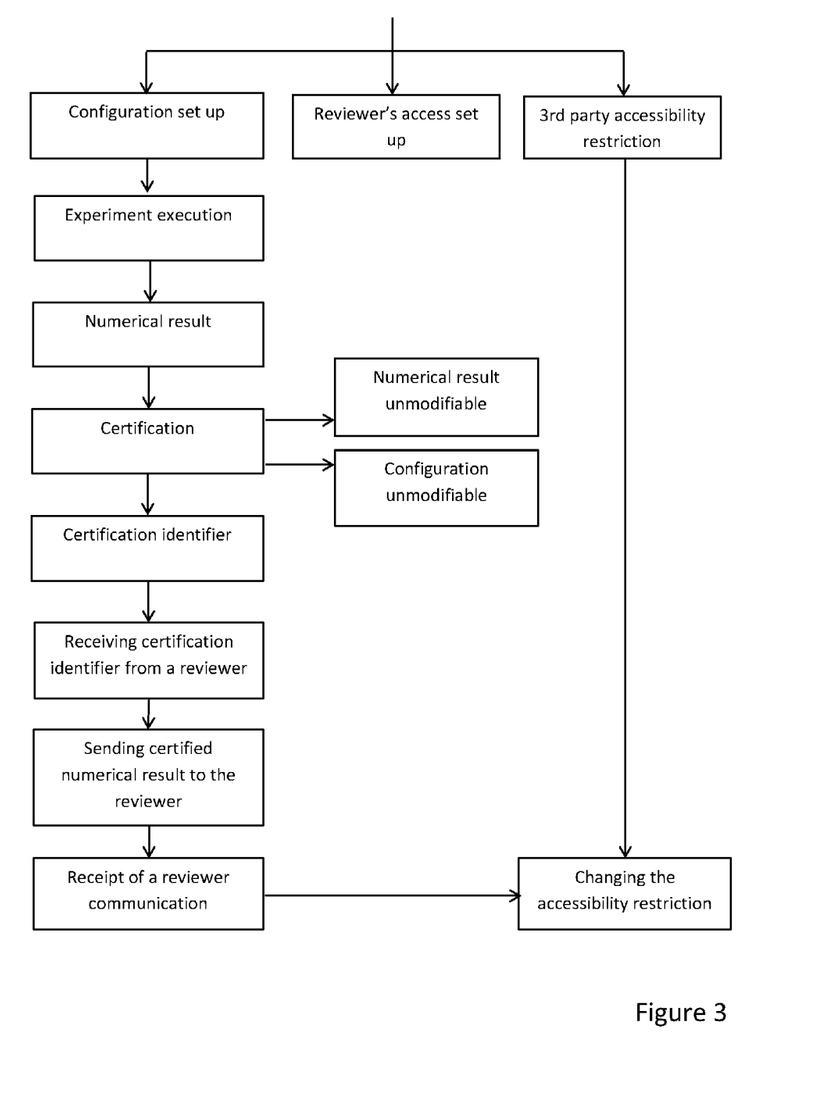
FIG. 3 shows a first embodiment of a method for reviewing a computer-executable experiment, according to the invention.

FIG. 3 schematically shows the above described method for reviewing a computer-executable experiment, from the point of view of the user 1.

From the user's side, the method for reviewing a computer-executable experiment comprises the step of:
setting up, on the internet-connected server 10, the given configuration for conducting the computer-executable experiment;
executing, on the server 10, the computer-executable experiment with the given configuration so to produce the numerical result;
certifying, on the server 10, the numerical result so to produce the certified result; wherein the certification can involve, on the server 10, making the certified numerical result and the experiment configuration unmodifiable;
generating, on the server 10, the certification identifier of the certified result.

In parallel, the method comprises the step of setting up, on the server 10, the controlled access for authorizing the reviewer 2 for:
providing the server 10 with the certification identifier; and
requesting and/or accessing, on the server 10, the certified numerical result on the basis of the provided certification identifier.

The method can further comprise a step of receiving the certification identifier.

Advantageously, the method can further comprise a step of receiving the certified results within a pre-formatted, editable, document.

The method can further comprise a step of setting up, on the server, the controlled access for authorizing a reviewer for producing a reproduced numerical result by executing, on the server 10, the experiment with the unmodifiable given configuration.

The method can further comprise a step of setting up, on the server, the controlled access for authorizing a reviewer for requesting and/or accessing to, on the server 10, the unmodifiable given configuration.

Advantageously, the method can further comprise a step of initially setting up, on the server 10, an accessibility restriction for third party for requesting and/or accessing, on the server, to the numerical result, the certified numerical result and the given configuration.

Advantageously, the method can further comprise a step of late changing the accessibility restriction for third party for requesting and/or accessing, on the server 10, to the certified numerical result, in particular as a result of a reception of a reviewing communication of the reviewer.

Figure 4:
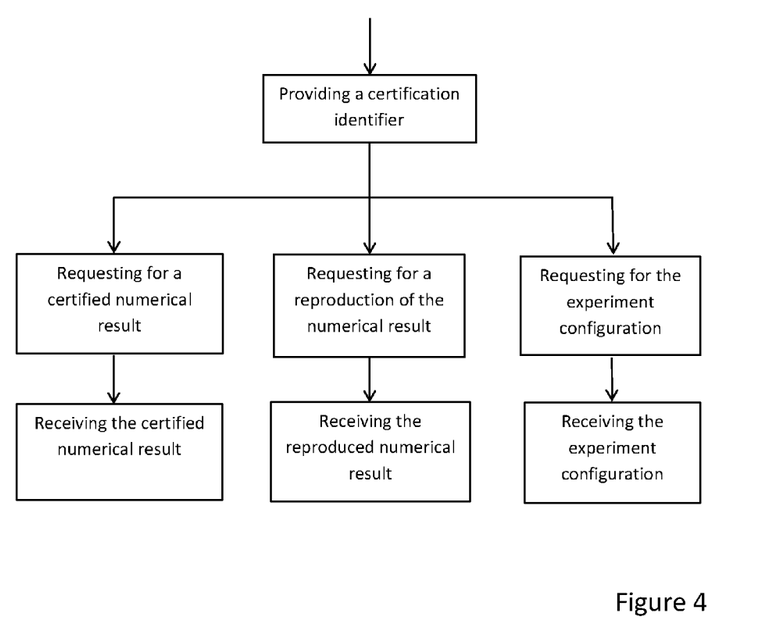
FIG. 4 shows a second embodiment of a method for reviewing a computer-executable experiment, according to the invention.

FIG. 4 schematically shows the above described method for reviewing a computer-executable experiment, from the point of view of the reviewer 2.

From the reviewer side, the method for reviewing a computer-executable experiment comprises a step of providing an internet-connected server with the certification identifier that has been provided with a work or document to be reviewed.

The method then comprises a step of:
requesting for and/or accessing to, on the server 10, the certified numerical result linked with the provided certification identifier; and/or
requesting for and/or accessing to unmodifiable given configuration; and/or
requesting for a reproduction of the certified numerical result by executing, on the server 10, the computer-executable experiment with the unmodifiable given configuration; and then requesting for and/or accessing to, on the server 10, the reproduced numerical result.

LIST OF REFERENCE NUMERALS

1 User
2 Reviewer
3 Third party
10 Server
11 Client device of the user
12 Client device of the reviewer
13 Client device of a third party
100 $1^{st}$ module
110 storing unit of the configuration setup
120 Experiment execution unit
130 Storing unit for the numerical result
140 Certification unit
150 Storing unit for the certified numerical result
151 Storing unit for the certified configuration
160 Generation unit of the certification identifier
170 Storing unit of the certification identifier
200 $2^{nd}$ module
210 Experiment execution unit
220 Storing unit of the reproduced numerical result
300 $3^{rd}$ module
410 Setting up an experiment configuration
420 Conducting a computer-executable experiment for producing a numerical result
430 Viewing numerical result of the experiment
440 Certifying the numerical result
450 Generating a certification identifier of the certified result
451 Receiving the certification identifier
460 Transmitting the certification identifier
470 Modifying 3th party accessing
480 Communicating a publication of the certified numerical result
510 Providing the certification identifier
520 Requesting the certified numerical result
521 Receiving the certified numerical result
530 Requesting the reproduction of a numerical result
540 Receiving the reproduced result
550 Communication
610 Requesting the certified numerical result
620 Receiving the certified numerical result

We claim:

1. An internet-connected server comprising:
a first module for authorizing a user to access the server and for setting up, on the server, a given configuration for conducting a computer-executable experiment; wherein the given configuration comprises at least an executable instruction and a parameter or input data;
an execution unit for executing, on the server, the computer-executable experiment with the given configuration so to produce a numerical result;
a certification unit for certifying, on the server, the numerical result so to produce a certified result; and an identifier generation unit for generating, on the server, a certification identifier of the certified result;

and the server further comprising a second module for authorizing a reviewer for:
providing the server with the certification identifier; and
requesting and/or accessing, on the server, the certified numerical result on the basis of the provided certification identifier;

wherein the certification unit is configured, on the server, to make at least one of the numerical result and the given configuration unmodifiable;

wherein each of the first module, the second module, the execution unit, the certification unit and the identifier generation unit comprises at least one of a hardware component with a processor and a server-executable instruction resident on a non-transitory server-readable storage medium.

2. The internet-connected server of claim 1, wherein the second module is arranged for allowing the authorized reviewer to reproduce, on the server, the experiment with the unmodifiable given configuration.

3. The internee-connected server of the claim 1, wherein the second module is arranged for allowing the authorized reviewer to request and/or access to, on the server, the unmodifiable given configuration.

4. The internet-connected server of claim 1, wherein the internet-connected server is a distributed or virtual or cloud server.

5. A method for reviewing a computer-executable experiment, the method comprising steps of:

setting up, on an internet-connected server, a given configuration for conducting the computer-executable experiment; wherein the given configuration comprises at least an executable instruction and a parameter or input data;

executing, on the server, the computer-executable experiment with the given configuration so to produce a numerical result;

certifying, on the server, the numerical result so to produce a certified result;

generating, on the server, a certification identifier of the certified result; and setting up, on the server, a controlled access for authorizing a reviewer for:
providing the server with the certification identifier; and
requesting and/or accessing, on the server, the certified numerical result on the basis of the provided certification identifier;

wherein the steps of certifying further comprises making, on the server, at least one of the numerical result and the given configuration unmodifiable.

6. The method of claim 5, further comprising a step of setting up, on the server, the controlled access for authorizing a reviewer for producing a reproduced numerical result by executing, on the server, the experiment with the unmodifiable given configuration.

7. The method of claim 5, further comprising a step of setting up, on the server, the controlled access for authorizing a reviewer for requesting and/or accessing to, on the server, the unmodifiable given configuration.

8. The method of claim 5, further comprising a step of setting up, on the server, an accessibility restriction for third party fur requesting and/or accessing, on the server, to the numerical result, the certified numerical result and the given configuration.

9. The method of claim 8, further comprising a step of changing the accessibility restriction for requesting and/or accessing, on the server, to the certified numerical result upon a reception of a reviewing communication of the reviewer.

10. The method of claim 9, wherein the accessibility restriction is changed from public unavailable to public available.

11. The method of claim 5, further comprising the steps of:
receiving, in the server, the certification identifier from a client device; and
sending the certified numerical result retrieved on the basis of the certification identifier received to the client device for displaying the certified numerical result.

* * * * *